UNITED STATES PATENT OFFICE.

LOUIS G. BADIER AND LIONEL B. HOLLIDAY, OF HUDDERSFIELD, ENGLAND, ASSIGNORS TO L. B. HOLLIDAY & CO. LIMITED, OF HUDDERSFIELD, ENGLAND, A CORPORATION OF GREAT BRITAIN.

PROCESS OF MANUFACTURE OF PICRIC ACID.

1,349,802. Specification of Letters Patent. Patented Aug. 17, 1920.

No Drawing. Application filed December 30, 1919. Serial No. 348,466.

*To all whom it may concern:*

Be it known that we, LOUIS GEORGES BADIER, a citizen of the Republic of France, and LIONEL BROOK HOLLIDAY, a subject of King George V of Great Britain, residing at Huddersfield, in the county of York, England, have invented a new and useful Improvement in the Processes of Manufacture of Picric Acid, of which the following is a specification.

This invention relates to a new process of manufacture of picric acid whereby we are enabled to operate on large quantities at the same time and to dispense with the use of carbolic acid, the essential feature of our invention in the manufacture of picric acid as compared with the ordinary process, being in the employment of dinitrophenol 1. 2. 4 obtained by the well known methods from commercial chlordinitrobenzene 1. 2. 4 which is produced on a very large scale.

According to our invention, we nitrate the dinitrophenol mixed with concentrated sulfuric acid. This process has the advantage of not emitting nitrous gases and enables the operation to be carried through at a normal temperature, thus the workmen employed in the process are not subjected to the harmful action of deleterious gases.

As an example of the process, 184 lbs. of commercial dinitrophenol are mixed with 468 lbs. of sulfuric acid at 98% of $H_2SO_4$. These quantities may, however, vary. For instance, we can take sulfuric acid at 92% and add fuming sulfuric acid at 70% $SO_3$ in quantities calculated to bring the mixture up to 98% or 100% of $H_2SO_4$. Although the proportion of sulfuric acid mixed with the dinitrophenol may vary considerably, the same result is obtained.

The dinitrophenol partly dissolves in the acid in lowering the temperature. When it is all introduced 104 lbs. of nitric acid at 42 degrees Baumé mixed with 104 lbs. sulfuric acid at 98% are poured into the above mixture, the temperature being maintained at 20 to 30 degrees centigrade. The mixture of sulfuric acid and nitric acid may also vary considerably provided that it contains the necessary quantity of nitric acid, namely 3 to 7% more than that which the theory requires to obtain complete nitration.

The temperature of nitration may also be very variable according to the quantity of sulfuric acid and nitric acid used, the larger the quantity of sulfuric acid used, the lower being the degree of temperature in completing the nitration, and the less the quantity of sulfuric acid used, the higher the temperature reached.

When the mixture has stood for about 12 hours, it is added to 600 gallons of cold water.

To get rid of the acid liquor, the picric acid formed is filtered, then washed on the filter with cold water, and afterward centrifuged and dried in a hot air ventilated room, whereupon it is then ready for use.

The picric acid presents itself in a state of fine powder constituted by microscopic crystals of pale yellow color.

The powder can also be treated by the quantity of boiling water necessary to obtain a saturated solution which by cooling deposits large crystals which can however, be obtained in a smaller form by a continued and slow agitation while cooling down.

Having thus described our invention, what we claim as new and desire to secure by Letters Patent is:

A method of manufacturing picric acid, which consists in first treating dinitrophenol with about two and one-half times its weight of concentrated sulfuric acid, and then adding to the mixture nitric and sulfuric acids in about equal proportions and with the nitric acid from three to seven per cent. in excess of the quantity required by theory to effect complete nitration, the temperature of the mixed liquids being maintained at from twenty to thirty degrees centigrade while the nitration is being effected.

In testimony whereof we affix our signatures in the presence of two witnesses.

LOUIS G. BADIER.
LIONEL B. HOLLIDAY.

Witnesses:
JOSEPH N. BYGOTT,
THOMAS H. BARRON.